US009224300B2

(12) United States Patent
Lee et al.

(10) Patent No.: US 9,224,300 B2
(45) Date of Patent: Dec. 29, 2015

(54) APPARATUS AND METHOD FOR CONTROLLING AUTONOMOUS VEHICLE PLATOONING (71) Applicant: Electronics and Telecommunications Research Institute, Daejeon (KR)

(72) Inventors: Sangwoo Lee, Daejeon (KR); Myungwook Park, Daejeon (KR); Wooyong Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/452,740

(22) Filed: Aug. 6, 2014

(65) Prior Publication Data
US 2015/0100192 A1    Apr. 9, 2015

(30) Foreign Application Priority Data
Oct. 7, 2013    (KR) ........................ 10-2013-0119257

(51) Int. Cl.
G08G 1/00        (2006.01)
G05D 1/02        (2006.01)
(52) U.S. Cl.
CPC ... G08G 1/22 (2013.01); G05D 1/02 (2013.01)
(58) Field of Classification Search
CPC ...................................................... G08G 1/22
USPC ........................................................ 701/23
See application file for complete search history.

(56) References Cited

U.S. PATENT DOCUMENTS
2012/0314643 A1    12/2012    Kim

FOREIGN PATENT DOCUMENTS
KR        1020060053649 A        10/2008

OTHER PUBLICATIONS
Bruce P. Kraemer et al., "IEEE 802.11p," LAN/MAN Standards Committee of the IEEE Computer Society, Jul. 2010.

Primary Examiner — Mary Cheung
Assistant Examiner — Anne Mazzara
(74) Attorney, Agent, or Firm — William Park & Associates Ltd.

(57) ABSTRACT

An apparatus and method for controlling autonomous vehicle platooning are disclosed. The apparatus for controlling autonomous vehicle platooning includes a frame format configuration unit, a synchronization unit, and a contention window assignment unit. The frame format configuration unit configures the format of a frame included in a communication channel applicable to the control of autonomous vehicle platooning. The synchronization unit synchronizes a plurality of vehicles with one another using the frame so that the vehicles can perform the autonomous vehicle platooning. The contention window assignment unit assigns the different contention window values of a slot for management of the frame to the respective synchronized vehicles. The control is performed using the assigned contention window values so that the vehicles can participate in the autonomous vehicle platooning.

10 Claims, 5 Drawing Sheets

APPARATUS AND METHOD FOR CONTROLLING AUTONOMOUS VEHICLE PLATOONING

CROSS-REFERENCE TO RELATED APPLICATION

This application claims the benefit of Korean Patent Application No. 10-2013-0119257, filed Oct. 7, 2013, which is hereby incorporated by reference in its entirety into this application.

BACKGROUND OF THE INVENTION

1. Technical Field

The present invention relates generally to an apparatus and method for controlling autonomous vehicle platooning and, more particularly, to a method and apparatus for controlling autonomous vehicle platooning using a medium access method based on non-contention between vehicles.

2. Description of the Related Art

With the advancement of intelligent vehicle technology, research into autonomous vehicle platooning technology in which multiple vehicles are autonomously driven in a platoon has been conducted.

Vehicle platooning is advantageous in that the use of fuel attributable to air resistance can be reduced because vehicles maintain a platoon, and in that the efficient utilization of a road can increase because vehicles can be driven in closer proximity than vehicles that are driven by drivers.

By way of example, Korean Patent Application Publication No. 10-2006-0053649 entitled "Vehicle and Vehicle Telecommunication Method of Group Driving" discloses a communication method that exchanges information about real-time locations, and information about the speeds, directions and states of multiple vehicles using Ad-hoc communication when the vehicles perform vehicle platooning toward a single destination and following vehicles follow a leading vehicle.

As described above, in order to perform autonomous vehicle platooning, vehicles that participate in a platoon need to exchange the locations and speeds of other vehicles within the platoon via communication between the vehicles. To use such information in autonomous driving, the information needs to be stably delivered at very fast cycles. A representative technique for communication between vehicles may include wireless access in vehicular environments (WAVE).

The 802.11p MAC protocol, which is a WLAN standard, is used in WAVE.

The 802.11p MAC protocol uses a carrier sense multiple access/collision avoidance (CSMA/CA) method, and is basically a contention-based communication medium access method.

A disadvantage of such a CSMA/CA method is that when content-based medium access is performed, packets are lost due to the simultaneous transmission of nodes and constant packet transfer delay is not guaranteed. Furthermore, it is disadvantageous in that there is no provision for a method for detecting a packet transfer failure in the case of a broadcast packet.

SUMMARY OF THE INVENTION

Accordingly, the present invention has been made keeping in mind the above problems occurring in the conventional art, and an object of the present invention is to provide a method and apparatus which are capable of guaranteeing the constant transfer delay of packets transmitted by vehicles and controlling autonomous vehicle platooning using a medium access method based on non-contention between the vehicles.

In accordance with an aspect of the present invention, there is provided a method of controlling autonomous vehicle platooning, including configuring a format of a frame included in a communication channel applicable to control of autonomous vehicle platooning synchronizing a plurality of vehicles with one another using the frame so that the vehicles perform the autonomous vehicle platooning; and assigning different contention window values of a slot for management of the frame to the respective synchronized vehicles, and performing control using the assigned contention window values so that the vehicles can participate in the autonomous vehicle platooning.

The format of the frame may include a slot for a beacon via which a leading vehicle (LV) sends a beacon to a vehicle that desires to participate in the autonomous vehicle platooning; a slot for an LV via which the LV sends information about itself; slots for FVs via which following vehicles (FVs) send respective pieces of information about themselves; and a slot for management via which information for managing a platoon corresponding to the autonomous vehicle platooning is transmitted and received.

Contention window values corresponding to the LV and the FVs and a contention window value corresponding to a vehicle that does not belong to the platoon and that desires to participate in the platoon may be configured in the slot for management, and a management frame may be transmitted based on differentiated priority.

The beacon transmitted via the slot for a beacon may be used for the LV to notify a vehicle desiring to participate in the autonomous vehicle platooning that the autonomous vehicle platooning is possible, and the beacon may include information about the platoon.

Synchronizing the plurality of vehicles with one another may include receiving, by an FV of the plurality of vehicles, a beacon transmitted by an LV; and performing, by the FV, timing synchronization with the LV using the received beacon.

In accordance with another aspect of the present invention, there is provided an apparatus for controlling autonomous vehicle platooning, including a frame format configuration unit configured to configure a format of a frame included in a communication channel applicable to control of autonomous vehicle platooning; a synchronization unit configured to synchronize a plurality of vehicles with one another using the frame so that the vehicles perform the autonomous vehicle platooning; and a contention window assignment unit configured to assign different contention window values of a slot for management of the frame to the respective synchronized vehicles; wherein control is performed using the assigned contention window values so that the vehicles can participate in the autonomous vehicle platooning.

The format of the frame may include a slot for a beacon via which a leading vehicle (LV) sends a beacon to a vehicle that desires to participate in the autonomous vehicle platooning; a slot for an LV via which the LV sends information about itself; slots for FVs via which following vehicles (FVs) send respective pieces of information about themselves; and a slot for management via which information for managing a platoon corresponding to the autonomous vehicle platooning is transmitted and received.

Contention window values corresponding to the LV and the FVs and a contention window value corresponding to a vehicle that does not belong to the platoon and that desires to participate in the platoon may be configured in the slot for management, and a management frame may be transmitted based on differentiated priority.

The beacon transmitted via the slot for a beacon may be used for the LV to notify a vehicle desiring to participate in the autonomous vehicle platooning that the autonomous vehicle platooning is possible, and the beacon may include information about the platoon.

Synchronizing the plurality of vehicles with one another may include receiving, by an FV of the plurality of vehicles, a beacon transmitted by an LV; and performing, by the FV, timing synchronization with the LV using the received beacon.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention are described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

An apparatus and method for controlling autonomous vehicle platooning according to embodiments of the present invention are described in detail with reference to the accompanying drawings.

Figure 1:
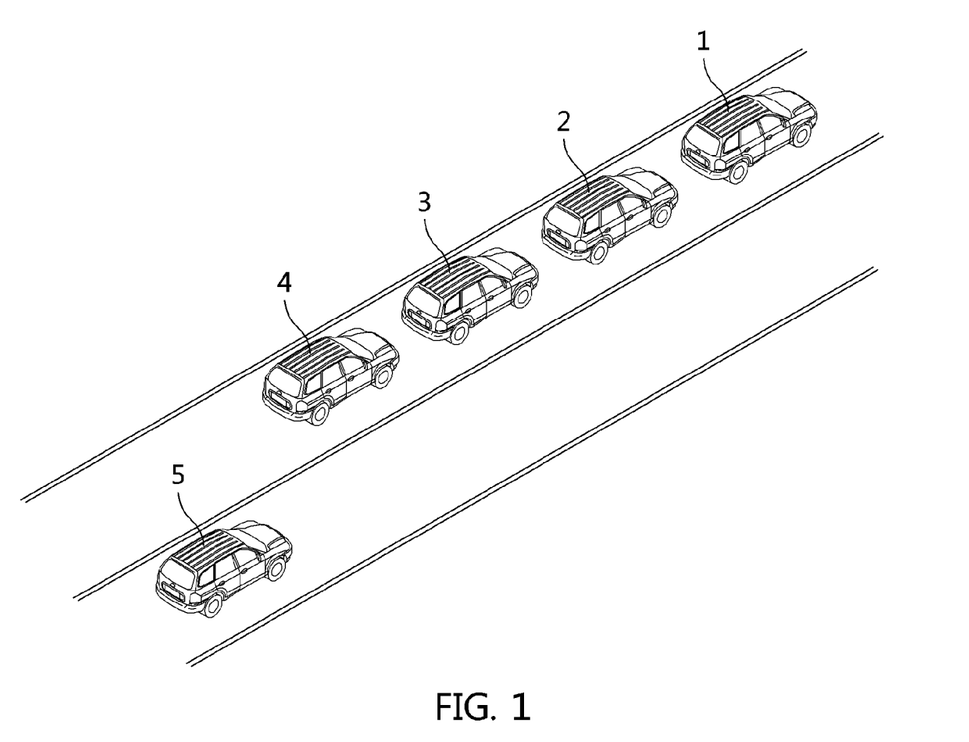
FIG. 1 is a diagram illustrating autonomous vehicle platooning according to an embodiment of the present invention.

FIG. 1 is a diagram illustrating autonomous vehicle platooning according to an embodiment of the present invention.

Referring to FIG. 1, a first vehicle 1 corresponds to a leading vehicle (LV). The LV notifies other vehicles that the LV is capable of autonomous vehicle platooning and manages a corresponding platoon.

Second to third vehicles 2 to 4 correspond to following vehicles (FVs). The FVs correspond to vehicles that receive a beacon signal advertized by the LV, that recognize that vehicle platooning is possible based on the beacon signal and that participate in the platoon via a series of procedures.

A fifth vehicle 5 is a vehicle that desires to participate in the platoon. The fifth vehicle 5 may receive the beacon signal advertized by the LV, and may participate in the platoon via a series of procedures.

The configuration of a communication channel applied to autonomous vehicle platooning is described in detail below with reference to FIG. 2.

Figure 2:
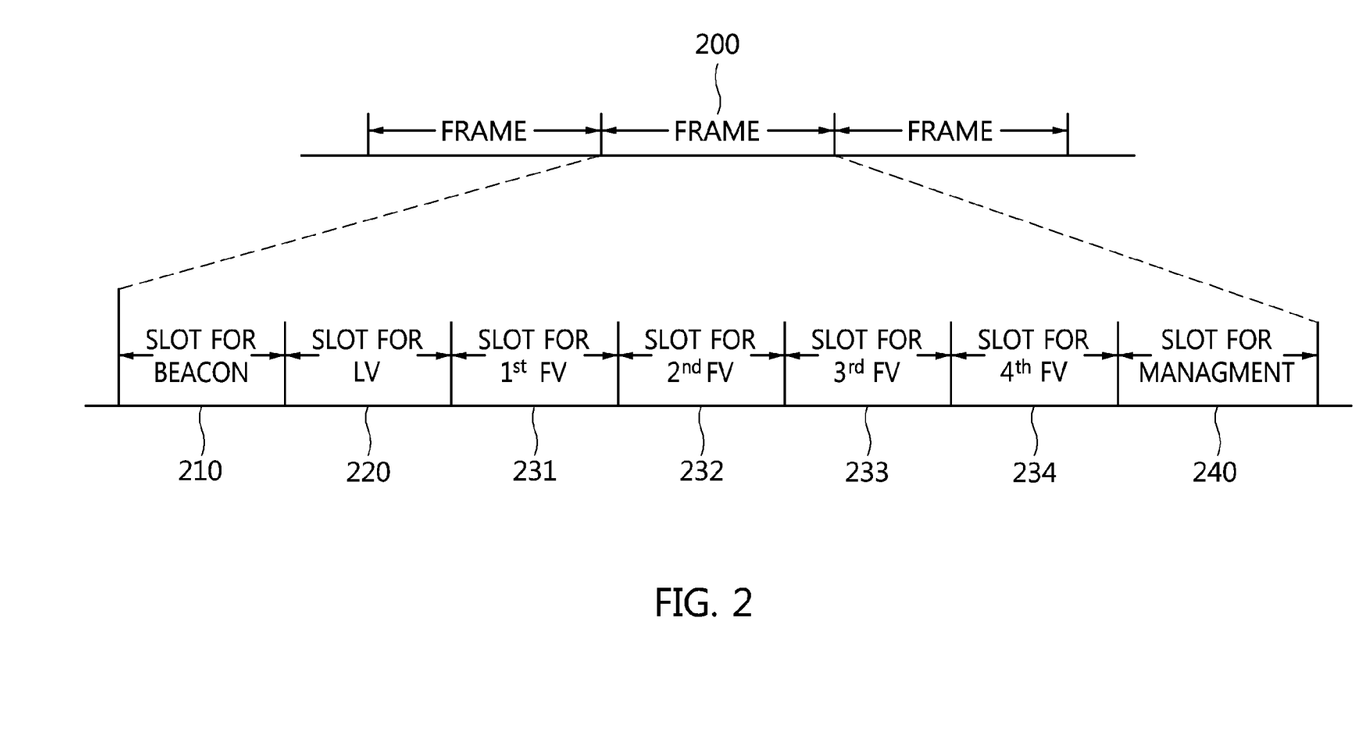
FIG. 2 is a diagram illustrating the configuration of a communication channel according to an embodiment of the present invention.

FIG. 2 is a diagram illustrating the configuration of the communication channel according to this embodiment of the present invention.

First, an apparatus and method for controlling autonomous vehicle platooning according to embodiments of the present invention propose a technique for controlling autonomous vehicle platooning using a non-contention type medium access control, not a contention-based CSMA/CA method based on a WAVE scheme. As described above, the channel applied to autonomous vehicle platooning is configured, as illustrated in FIG. 2.

Referring to FIG. 2, the channel includes at least one frame 200.

The frame 200 includes a slot for a beacon 210, a slot for an LV 220, slots for FVs (e.g., a slot for 1st FV to a slot for 4st FV) 231 to 234, and a slot for management 240.

The slot for a beacon 210 corresponds to a time slot via which a beacon may be transmitted. The beacon is used for the LV to notify a vehicle desiring to participate in autonomous vehicle platooning that autonomous vehicle platooning is possible and to notify the vehicle of information related to a platoon.

The slot for an LV 220 corresponds to a time slot via which the LV may send information about itself.

The slots for FVs 231 to 234 correspond to time slots via which the respective FVs may send information about themselves. That is, each of the FVs may send information about itself via a slot assigned by the LV.

The slot for management 240 corresponds to a time slot via which information used to manage a platoon is transmitted and received.

In order to configure a channel including a frame, such as that of FIG. 2, as described above, the vehicles need to undergo timing synchronization.

For this purpose, the FV may receive a beacon from the LV and be synchronized with the LV using information including the received beacon, or may be synchronized with the LV using timing information extracted from a device, such as a GPS.

The configuration of the slot for management 240 is described in detail with reference to FIG. 3.

Figure 3:
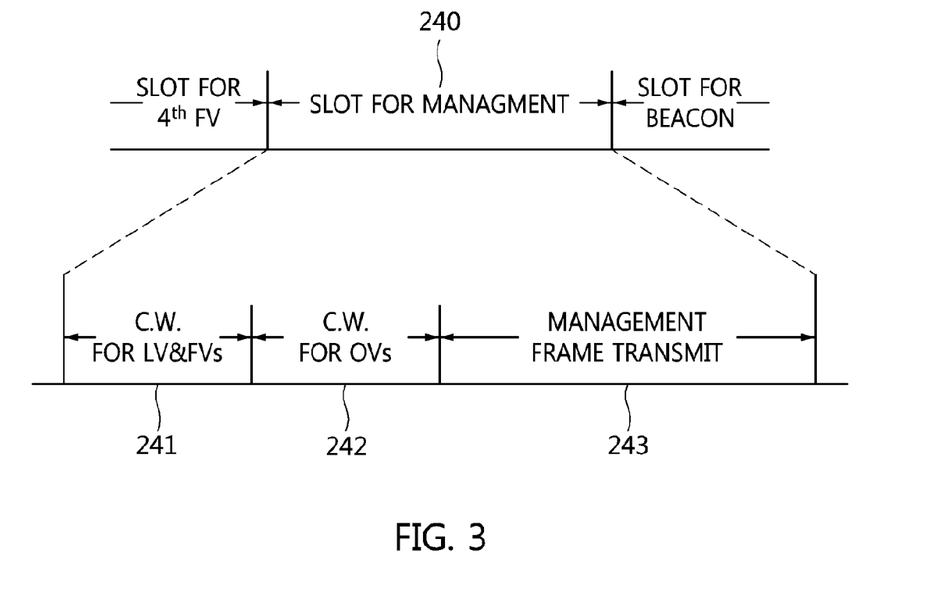
FIG. 3 is a diagram illustrating the configuration of a slot for management in a frame according to an embodiment of the present invention.

FIG. 3 is a diagram illustrating the configuration of the slot for management in a frame according to an embodiment of the present invention.

First, the slot for management 240 is used as information that is used to manage a platoon when autonomous vehicle platooning is performed. In this case, it is inefficient to assign a time slot to each vehicle because a vehicle that will send information used to manage a platoon is unknown. Accordingly, medium access is performed based on a contention method.

Referring to FIG. 3, a contention window value 241 corresponding to an LV and FVs and a contention window value 242 corresponding to vehicles that desire to participate in a platoon are configured in the slot for management 240. The management frame is transmitted based on differentiated priority.

An apparatus for controlling autonomous vehicle platooning via a channel, such as that illustrated in FIGS. 2 and 3, is described in detail below with reference to FIG. 4.

Figure 4:
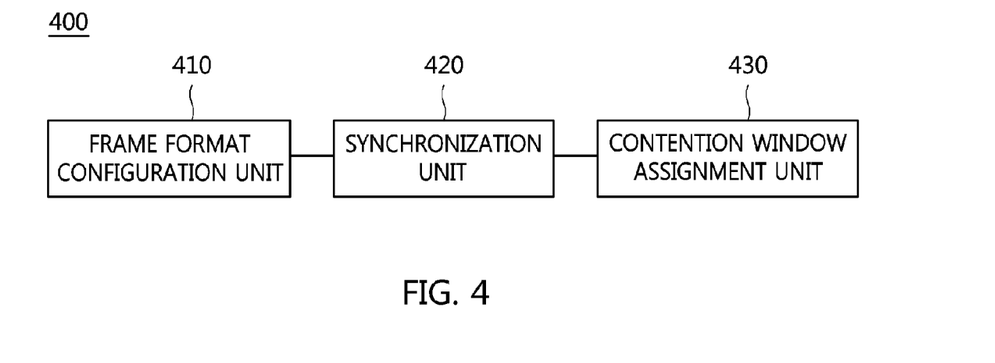
FIG. 4 is a diagram illustrating an apparatus for controlling autonomous vehicle platooning according to an embodiment of the present invention.

FIG. 4 is a diagram illustrating an apparatus for controlling autonomous vehicle platooning according to an embodiment of the present invention.

Referring to FIG. 4, the apparatus 400 for controlling autonomous vehicle platooning includes a frame format configuration unit 410, a synchronization unit 420, and a contention window assignment unit 430.

The frame format configuration unit 410 configures the format of a frame included in a communication channel that may be applied to the control of autonomous vehicle platooning.

More specifically, the frame format configuration unit 410 configures the format of the frame 200, as illustrated in FIG. 2. The frame format configuration unit 410 divides the single frame 200 into the slot for a beacon 210, the slot for an LV 220, the slots for FVs 231 to 234, and the slot for management 240.

The synchronization unit 420 synchronizes a plurality of vehicles with one another using the frame configured by the frame format configuration unit 410 so that the vehicles perform autonomous vehicle platooning. For example, an FV may receive a beacon transmitted by an LV and be synchronized with the LV using information included in the received beacon, or may be synchronized with the LV using timing information extracted from a device, such as a GPS.

The contention window assignment unit 430 assigns contention window values to an LV, at least one FV, and vehicles not belonging to a platoon, respectively, so that the vehicles have different contention window values in the slot for management 240 that is placed at the front of the frame.

For example, the contention window assignment unit 430 may assign "0" to an LV, "1" to a first FV, "2" to a second FV, "3" to a third FV, "4" to a fourth FV and "5" or higher values to vehicles not belonging to a platoon. That is, the contention window assignment unit 430 assigns different contention window values to respective vehicles, thereby being able to minimize a collision probability.

A method of controlling autonomous vehicle platooning is described in detail below with reference to FIG. 5.

Figure 5:
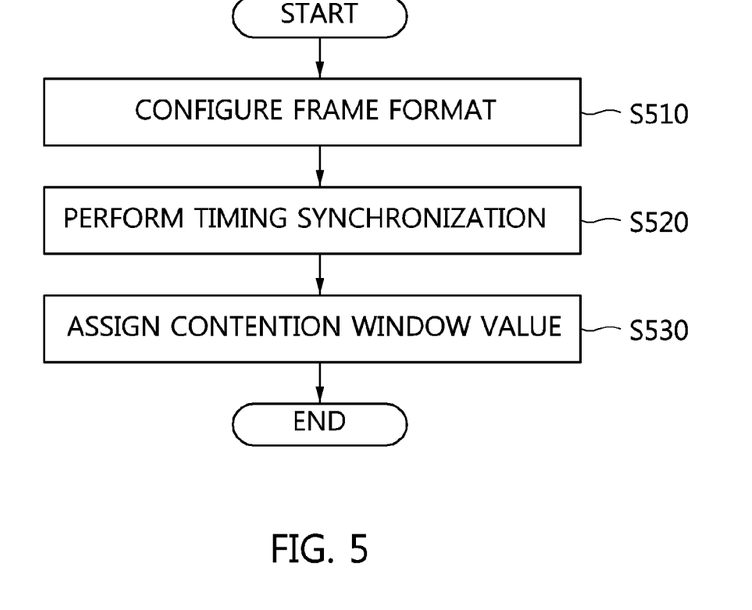
FIG. 5 is a flowchart illustrating a method of controlling autonomous vehicle platooning according to an embodiment of the present invention.

FIG. 5 is a flowchart illustrating a method of controlling autonomous vehicle platooning according to an embodiment of the present invention.

Referring to FIG. 5, an apparatus 400 for controlling autonomous vehicle platooning configures the format of a frame included in a communication channel that may be applied to control autonomous vehicle platooning at step S510.

More specifically, the frame format configuration unit 410 configures the frame so that the frame includes the slot for a beacon 210, the slot for an LV 220, the slots for FVs 231 to 234, and the slot for management 240. In this case, the slot for a beacon 210 corresponds to a time slot via which a beacon may be transmitted, the beacon enabling an LV to notify a vehicle desiring to participate in autonomous vehicle platooning that the autonomous vehicle platooning is possible and to notify the vehicle of information related to the platoon. The slot for an LV 220 corresponds to a time slot via which an LV may send information about itself. The slots for FVs 231 to 234 correspond to time slots via which FVs may send information about themselves, respectively. The slot for management 240 corresponds to a time slot via which information for managing a platoon is transmitted and received.

The apparatus 400 for controlling autonomous vehicle platooning synchronizes a plurality of vehicles with one another using the frame configured by the frame format configuration unit 410 so that the vehicles perform autonomous vehicle platooning at step S520.

The apparatus 400 for controlling autonomous vehicle platooning assigns contention window values to an LV, at least one FV, and vehicles not belonging to a platoon, respectively, so that the vehicles have different contention window values in the slot for management 240 that is placed in the front part of the frame at step S530.

As described above, the apparatus 400 for controlling autonomous vehicle platooning according to an embodiment of the present invention may assign contention window values to an LV, at least one FV, and vehicles not belonging to a platoon, respectively, and may control autonomous vehicle platooning based on the assigned contention window values.

A process in which a vehicle not belonging to a platoon participates in a platoon in the method of controlling autonomous vehicle platooning is described in detail below with reference to FIG. 6.

Figure 6:
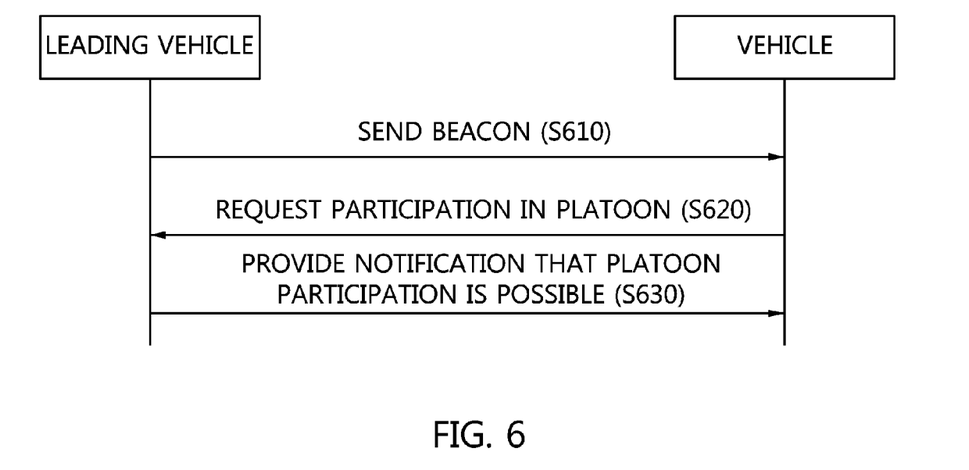
FIG. 6 is a diagram illustrating a process in which a vehicle not belonging to a platoon participates in the platoon in the method of controlling autonomous vehicle platooning according to an embodiment of the present invention.

FIG. 6 is a diagram illustrating a process in which a vehicle not belonging to a platoon participates in a platoon in the method of controlling autonomous vehicle platooning according to an embodiment of the present invention.

First, a vehicle that does not belong to a platoon and that desires to participate in autonomous vehicle platooning needs to check whether a platoon is present nearby.

Referring to FIG. 6, an LV sends a beacon periodically. In this case, the beacon includes information about a platoon that performs autonomous vehicle platooning and information about currently available slots.

The LV sends the beacon, including the pieces of information, to vehicles via the slot for a beacon 210 at step S610.

A vehicle that has received the beacon sends a platoon participation request to the LV along with information indicative that the vehicle desires to participate in the platoon using a specific one of the currently available slots included in the beacon at step S620. In this case, the vehicle sends the platoon participation request to the LV using the slot for management 240.

The LV notifies the vehicle that has sent the platoon participation request that the specific slot is available using the beacon at step S630. In this case, the specific slot corresponds to one of the slots for FVs 231 to 234.

The vehicle becomes aware of a slot for FV corresponding to itself via the received beacon, and participates in the platoon using the slot for FV, thereby being able to participate in autonomous vehicle platooning.

A process in which a vehicle belonging to a platoon withdraws from the platoon in the method of controlling autonomous vehicle platooning is described in detail below with reference to FIG. 7.

Figure 7:
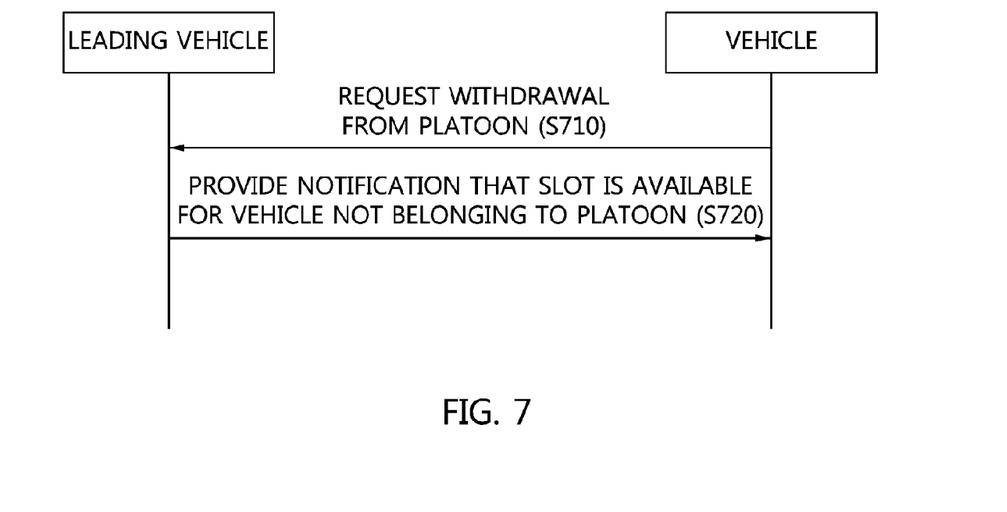
FIG. 7 is a diagram illustrating a process in which a vehicle belonging to a platoon withdraws from the platoon in the method of controlling autonomous vehicle platooning according to an embodiment of the present invention.

FIG. 7 is a diagram illustrating a process in which a vehicle belonging to a platoon withdraws from a platoon in the method of controlling autonomous vehicle platooning according to an embodiment of the present invention.

Referring to FIG. 7, a vehicle that belongs to vehicles participating in autonomous vehicle platooning and that desires to withdraw from the platoon sends a platoon withdrawal request to an LV via the slot for management 240 at step S710.

The LV notifies the vehicle having sent the platoon withdrawal request that a slot for FV corresponding to the vehicle is available for a vehicle not belonging to the platoon via a beacon at step S720. The vehicle that has received the beacon at step S720 withdraws from the platoon, and does not use the corresponding slot for FV.

As described above, the apparatus and method for controlling autonomous vehicle platooning according to the embodiments of the present invention can configure the format of a frame included in a communication channel that may be applied to control autonomous vehicle platooning, and can synchronize a plurality of vehicles with one another using the configured frame so that the vehicles perform the autonomous vehicle platooning and assign contention window values to the respective vehicles so that the vehicles have different contention window values in the slot for management 240 that is placed in the front part of the frame.

As described above, the apparatus and method for controlling autonomous vehicle platooning according to the embodiments of the present invention can guarantee the constant transmission delay of packets transmitted by a vehicle, and can control autonomous vehicle platooning using a medium access method based on non-contention between vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling autonomous vehicle platooning, comprising:
   configuring a format of a frame included in a communication channel applicable to control of autonomous vehicle platooning;
   synchronizing a plurality of vehicles with one another using the frame so that the vehicles perform the autonomous vehicle platooning; and
   assigning different contention window values of a slot for management of the frame to the respective synchronized vehicles, and performing control using the assigned contention window values so that the vehicles participate in the autonomous vehicle platooning,
   wherein a first leading vehicle (LV) notifies other vehicles that the LV is capable of autonomous vehicle platooning in a vehicle platoon;
   wherein vehicles (FV) following the LV receive a beacon signal from the LV and participate in the vehicle platoon via a series of procedures, and
   wherein non-FV vehicles that desire to participate in the vehicle platoon receive the beacon signal from the LV and participate in the vehicle platoon via the series of procedures.

2. The method of claim 1, wherein the format of the frame comprises:
   a slot for a beacon via which LV sends the beacon signal to the non-FV vehicle that desires to participate in the autonomous vehicle platooning;
   a slot for the LV via which the LV sends information about itself;
   slots for the FVs via which the FVs send respective pieces of information about themselves; and
   a slot for management via which information for managing the vehicle platoon corresponding to the autonomous vehicle platooning is transmitted and received.

3. The method of claim 2,
   wherein contention window values corresponding to the LV and the FVs and a contention window value corresponding to a non-FV vehicle that does not belong to the platoon and that desires to participate in the vehicle platoon are configured in the slot for management, and a management frame is transmitted based on differentiated priority.

4. The method of claim 2,
   wherein the beacon transmitted via the slot for a beacon is used for the LV to notify a non-FV vehicle desiring to participate in the autonomous vehicle platooning that the autonomous vehicle platooning is possible, and the beacon comprises information about the vehicle platoon.

5. The method of claim 1, wherein synchronizing the plurality of vehicles with one another comprises:
   performing, by the FV, timing synchronization with the LV using a received beacon.

6. An apparatus for controlling autonomous vehicle platooning, comprising:
   a frame format configuration unit configured to configure a format of a frame included in a communication channel applicable to control of autonomous vehicle platooning;
   a synchronization unit configured to synchronize a plurality of vehicles with one another using the frame so that the vehicles perform the autonomous vehicle platooning; and
   a contention window assignment unit configured to assign different contention window values of a slot for management of the frame to the respective synchronized vehicles;
   wherein control is performed using the assigned contention window values so that the vehicles participate in the autonomous vehicle platooning,
   wherein a first leading vehicle (LV) notifies other vehicles that the LV is capable of autonomous vehicle platooning in a vehicle platoon;
   wherein vehicles (FV) following the LV receive a beacon signal from the LV and participate in the vehicle platoon via a series of procedures, and
   wherein non-FV vehicles that desire to participate in the vehicle platoon receive the beacon signal from the LV and participate in the vehicle platoon via the series of procedures.

7. The apparatus of claim 6, wherein the format of the frame comprises:
   a slot for the beacon signal via which the LV sends the beacon signal to the non-FV vehicle that desires to participate in the autonomous vehicle platooning;
   a slot for the LV via which the LV sends information about itself;
   slots for FVs via which the FVs send respective pieces of information about themselves; and
   a slot for management via which information for managing the vehicle platoon corresponding to the autonomous vehicle platooning is transmitted and received.

8. The apparatus of claim 7, wherein contention window values corresponding to the LV and the FVs and a contention window value corresponding to the non-FV vehicle that does not belong to the vehicle platoon and that desires to participate in the vehicle platoon are configured in the slot for management, and a management frame is transmitted based on differentiated priority.

9. The apparatus of claim 7,
   wherein the beacon signal transmitted via the slot for the beacon is used for the LV to notify the non-FV vehicle desiring to participate in the autonomous vehicle platooning that the autonomous vehicle platooning is possible, and the beacon comprises information about the vehicle platoon.

10. The apparatus of claim 6, wherein synchronizing the plurality of vehicles with one another comprises:
performing, by the FV, timing synchronization with the LV using the received beacon.

* * * * *